United States Patent
Liang et al.

[11] Patent Number: 5,077,969
[45] Date of Patent: Jan. 7, 1992

[54] COOLED LINER FOR HOT GAS CONDUIT

[75] Inventors: George P. Liang, Palm City; Curtis C. Cowan, Palm Beach Gardens, both of Fla.

[73] Assignee: United Technologies Corporation, Hartford, Conn.

[21] Appl. No.: 505,739

[22] Filed: Apr. 6, 1990

[51] Int. Cl.$^5$ .............................. F02K 3/10; F02C 1/00
[52] U.S. Cl. ..................................... 60/261; 60/757; 60/759
[58] Field of Search ................. 60/754, 755, 757, 759, 60/226.1, 261

[56] References Cited

U.S. PATENT DOCUMENTS

| | | | |
|---|---|---|---|
| 2,840,989 | 7/1958 | Macaulay | 60/39.65 |
| 4,051,670 | 10/1977 | Pierce | 60/261 |
| 4,267,698 | 5/1981 | Hartmann et al. | 60/756 |
| 4,335,573 | 6/1982 | Wright | 60/261 |
| 4,566,280 | 1/1986 | Burr | 60/754 |
| 4,622,821 | 11/1986 | Madden | 60/757 |
| 4,700,544 | 10/1987 | Fucci | 60/759 |
| 4,751,962 | 6/1988 | Havekost | 60/754 |
| 4,800,718 | 1/1989 | Zimmerman | 60/264 |
| 4,989,407 | 2/1991 | Grant | 60/261 |

FOREIGN PATENT DOCUMENTS 582479 9/1958 Italy ........................................ 60/755

*Primary Examiner*—Louis J. Casaregola
*Assistant Examiner*—John A. Savio, III
*Attorney, Agent, or Firm*—Edward L. Kochey, Jr.

[57] ABSTRACT

A plurality of gas diffusion openings (24) direct film cooling air (26) along the surface of sheet (20). Each opening (24) includes a baffle (28) extending into gas stream (10) defining gas chamber (30) with outlet opening (32). Cool air inlet opening (34) meters and directs impingement air against the upstream end (36) of the baffle. cooling air discharge is parallel to the surface to be cooled and the baffle directs the upstream hot air flow.

8 Claims, 1 Drawing Sheet

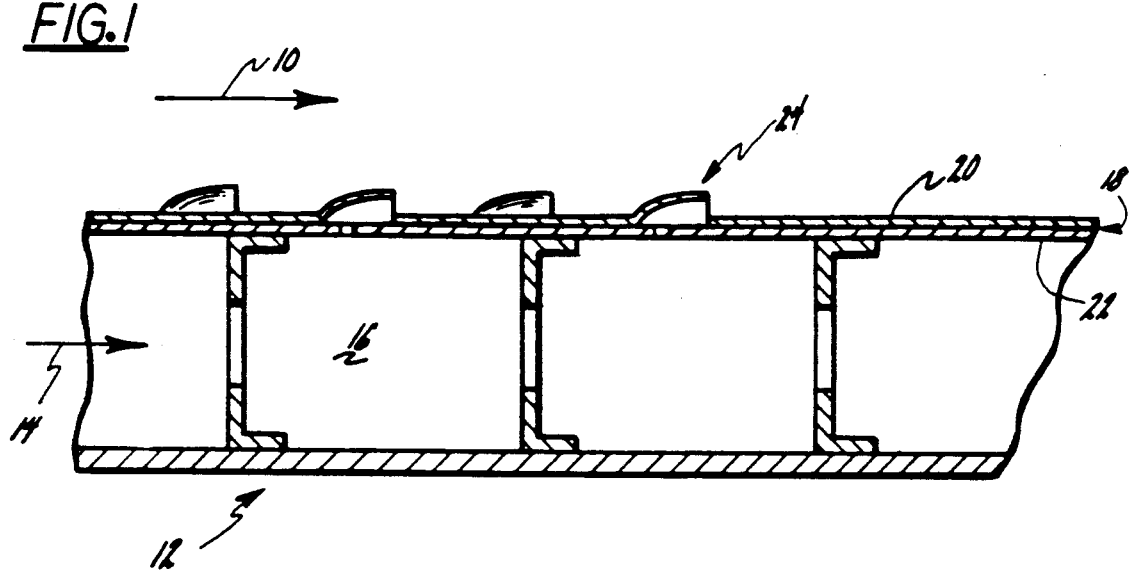
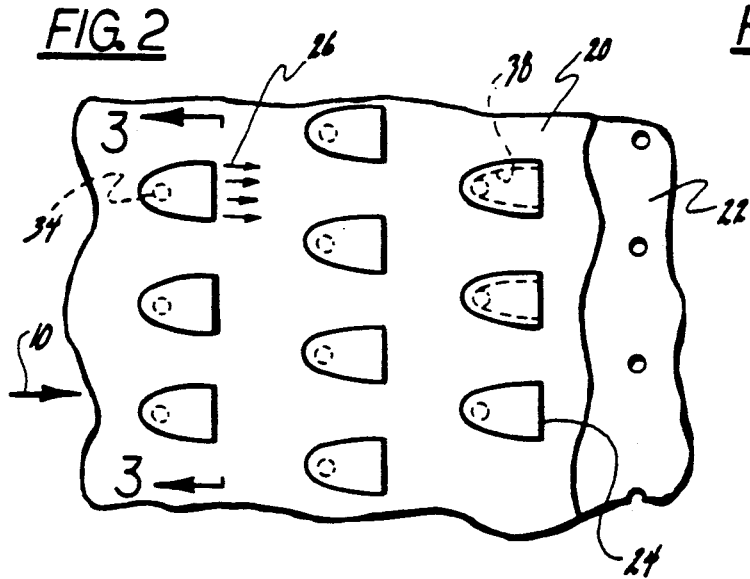
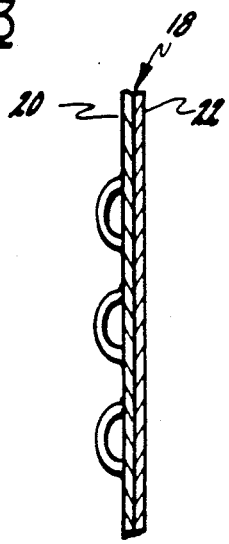
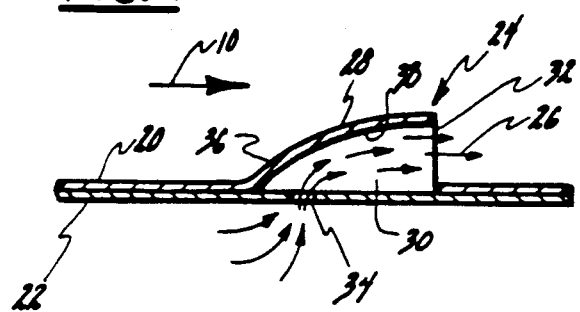

COOLED LINER FOR HOT GAS CONDUIT

The Government has rights in this invention to a contract awarded by the Government.

TECHNICAL FIELD

The invention relates to thin metal liners for conduits conveying hot gas, and in particular to a structure for cooling the liner.

BACKGROUND OF THE INVENTION

Gas turbine engine discharge ducts and nozzles can carry gas in the order of 2500 C during operation. It is conventional to supply liners to protect the underlying structure from the high exhaust gas temperature. It is furthermore conventional to cool these liners with a flow of cool air from a selected location in the compressor or engine by-pass fan duct.

Film cooling which establishes the layer of relatively cool air along the wall is known to be effective. Various approaches have been used with holes through a thin liner which introduced the air. Even openings located with flow perpendicular to the surface are effective. Other approaches introduce the air at an angle in the direction of the gas flow and these methods have shown more effective cooling. It is, however, difficult to establish that direction of cooling air with the very thin liner which is used.

High cooling effectiveness is also found in designs using louvers which extend along the surface transverse to the gas flow. These louvers overlap the liner section with the cool air being introduced between the overlapping member and the base member. Such air introduction is therefore parallel to the downstream surface with no significant radial flow component. Such introduction of the cooling air has been very effective.

The louver construction, however, requires a large number of pieces to establish the overlapping section. It also steps the diameter at each louver or must otherwise be based on a conical section to compensate for these steps. The dimensional control of the outlet has been difficult because of distortion of the overlapping portion at the louver outlet. This results in erratic variation of the slot height and mass flow ratio out of the slot. Consequently, the film effectiveness level and surface temperature are subject to undesirable variations.

SUMMARY OF THE INVENTION

In accordance with the invention, the liner has a plurality of diffusion openings arranged in checkerboard pattern for admission of the cooling air. These openings introduce the cool air in a direction similar to that to the conventional louver liners, but without the multiplicity of pieces and other problems associated with the conventional louvers.

Each of the diffusion openings includes a baffle extending into the hot gas stream. This preferably is formed by an indentation into the gas stream placed in the metal sheet adjacent the gas stream. The chamber formed within the baffle is preferably bounded by a second plate without the indentations and which is bounded to the plate adjacent the hot gas. The airflow is metered by a small opening in the second sheet impinging on the upstream portion of the baffle and expanding and diffusing within the chamber. An outlet opening provided at the downstream end of the baffle chamber, with respect to the flow of hot gas, permits the diffused flow to pass parallel to the surface to be cooled.

The overall cooling is achieved with these diffusion openings located in a checkerboard pattern with these being located sufficiently close in a transverse direction to permit full cooling of the surface.

BRIEF DESCRIPTION OF THE DRAWINGS

FIG. 1 is a view of the liner structure showing the hot gas flow location;

FIG. 2 is a top view of the liner from the hot side;

FIG. 3 is a view of section 3-3 through FIG. 2; and

FIG. 4 is a sectional side elevation through one diffusion opening.

DESCRIPTION OF THE PREFERRED EMBODIMENT

Referring to FIG. 1 there is shown a flow of hot gas indicated as 10 through the conduit, and the structure 12 which is to be cooled. A flow of cooling air 14 is supplied from the by-pass fan duct passing into plenum 16 where it is available for film cooling of the hot surfaces.

The liner 18 is formed of a metal sheet 20 adjacent the stream of hot gas 10 and a cold side metal sheet 22 bonded to sheet 20. A plurality of gas diffusion openings 24 are located in the liner.

The gas diffusion openings 24 are located in a checkerboard pattern as shown in FIG. 2. Each opening is located in an alternate location in alternate rows. Each is arranged to provide a discharge of cooling air 26 parallel to the surface of plate 20 in the same direction as the flow of hot gas 10.

As illustrated in FIG. 4, each gas diffusion opening 24 includes a baffle 28 extending into gas stream 10. The baffle defines a gas chamber 30 with an outlet opening 32 at the downstream end thereof with respect to the flow of hot gas through which the cooling air 26 passes to establish the film cooling of the surface.

Cold side wall 22 forms a bounding surface of each chamber on the side opposite that of baffle 28. An air inlet opening 34 passes through the cold side wall into the chamber. This permits the flow of cooling air from plenum 16 into chamber 30. It further provides impingement cooling of area 36 at the upstream end of the baffle.

The inner walls 38 of the baffle forming the chamber are directed in a nonconvergent manner so that the air passing from the chamber will not converge or discharge. Preferably these are located with some actual divergence to provide a basis for the spreading of the discharged cooling air 26. The shape of each baffle is that of an elongated semidome which is elongated in the direction of gas flow, thereby presenting a streamlined surface to the gas passing adjacent to the surface 20 inside the hot gas duct. This causes a baffling and pushing out of the gas flow upstream of each baffle facilitating the effectiveness of the introduction of the cooling air 26.

It is also noted that the inlet opening 34 is located to impinge on the upstream end of baffle 28 at location 36. Since location 36 is exposed to a scrubbing action of the gases passing inside the duct, the heat transfer tends to be a little higher than it is at other locations and the location of the impingement air counters this.

The area of opening 34 is significantly less than outlet 32, preferably on the order of 1 to 5. Accordingly, the air passing into chamber 30 is diffused throughout the chamber and passes at low velocity at exit 26. The density times the velocity of this flow discharge 26 is preferably on the order of one-half the product of the hot gas density times the hot gas velocity when operating at the maximum temperature condition.

We claim:

1. A cooled liner for a conduit conveying a stream of hot gas comprising:

a metal sheet adjacent to said stream of hot gas;

a plurality of gas diffusion openings in said metal sheet;

means for passing cool air through said gas diffusion openings;

each gas diffusion opening including a baffle extending into said stream of hot gas and defining a chamber having an outlet opening on the downstream side thereof with respect to the stream of hot gas;

a cold side wall forming the bounding surface of each chamber opposite the baffle extension;

an inlet opening through each cold side wall into each chamber of an area less than the area of the outlet opening of the corresponding chamber;

said liner formed of a hot side metal sheet and a cold side metal sheet bonded thereto;

each baffle formed of an indentation in said hot side metal sheet; and said cold side metal sheet forming said cold side wall.

2. A cooled liner as in claim 1:

each indentation having an elongated semidome shape streamlined in the direction of said hot gas stream.

3. A cooled liner as in claim 1 each inlet opening arranged to impinge cool air passing therethrough against said baffle at an upstream portion of said baffle.

4. A cooled liner as in claim 1 the sides of said baffle forming the sides of said chamber along the general direction of the gas stream being nonconverging.

5. A cooled liner as in claim 4 the sides of said baffle forming the sides of said chamber along the general direction of the gas stream being divergent.

6. A cooled liner as in claim 2 each inlet opening arranged to impinge cool air passing therethrough against said baffle at an upstream portion of said baffle.

7. A cooled liner as in claim 6 the sides of said baffle forming the sides of said chamber along the general direction of the gas stream being nonconverging.

8. A cooled liner as in claim 7 the sides of said baffle forming the sides of said chamber along the general direction of the gas stream being divergent.

* * * * *